US012695290B2

(12) United States Patent
Tannhäuser et al.

(10) Patent No.: US 12,695,290 B2
(45) Date of Patent: Jul. 28, 2026

(54) METHOD FOR OPERATING AN ELECTRONIC CIRCUIT BREAKER, ELECTRONIC CIRCUIT BREAKER, AND ELECTRIC SYSTEM COMPRISING AN ELECTRONIC CIRCUIT BREAKER

(71) Applicant: Siemens Aktiengesellschaft, Munich (DE)

(72) Inventors: Marvin Tannhäuser, Hausen (DE); Fabian Döbler, Theilenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 157 days.

(21) Appl. No.: 18/837,796

(22) PCT Filed: Jan. 31, 2023

(86) PCT No.: PCT/EP2023/052275
§ 371 (c)(1),
(2) Date: Aug. 12, 2024

(87) PCT Pub. No.: WO2023/160965
PCT Pub. Date: Aug. 31, 2023

(65) Prior Publication Data
US 2025/0183651 A1      Jun. 5, 2025

(30) Foreign Application Priority Data
Feb. 25, 2022    (DE) ..................... 10 2022 201 963.6

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC ........... H02H 3/066; H02H 3/40; H02H 7/26; H02H 3/07; G01R 31/50; G01R 31/52
See application file for complete search history.

(56) References Cited

U.S. PATENT DOCUMENTS 4,107,778 A    8/1978  Nii et al.
4,568,872 A    2/1986  Heller et al.
(Continued)

FOREIGN PATENT DOCUMENTS

EP          3770936 A1    1/2021
WO      2022136414 A1    6/2022

OTHER PUBLICATIONS

PCT International Search Report and Written Opinion of International Searching Authority mailed May 15, 2023 corresponding to PCT International Application No. PCT/EP2023/052275 filed Jan. 31, 2023.

*Primary Examiner* — Daniel Cavallari
(74) *Attorney, Agent, or Firm* — Schmeiser Olsen PLLC

(57) ABSTRACT

A method for operating a circuit breaker which protects an electric circuit is provided. The circuit breaker has a mechanical switch element and an electronic switch element connected in series thereto. In one step, the circuit is reactivated by the electronic switch element after being deactivated by the electronic switch element due to a short-circuit in the protected circuit, the short-circuit being detected by the circuit breaker. At least two current measurement values separated by a time interval are ascertained for the current flowing through the circuit breaker, and two voltage values separated by a time interval are ascertained for load-side terminals of the electronic circuit breaker. The circuit is deactivated again by the electronic switch element when criteria. Finally, the impedance of the line between the circuit breaker and the short-circuit location is calculated (Continued)

from the voltage values and the current measurement values and the time interval thereof.

15 Claims, 5 Drawing Sheets

(56) References Cited

U.S. PATENT DOCUMENTS

| | | | |
|---|---|---|---|
| 2012/0113555 A1* | 5/2012 | Mousavi | .................. H02H 3/40 |
| | | | 324/555 |
| 2020/0058454 A1* | 2/2020 | Askan | .................... H02H 3/025 |
| 2022/0231499 A1* | 7/2022 | Chen | ...................... H02H 7/122 |
| 2024/0055197 A1 | 2/2024 | Tannhäuser | |
| 2025/0080110 A1* | 3/2025 | Yun | .................. H03K 17/08142 |

* cited by examiner

METHOD FOR OPERATING AN ELECTRONIC CIRCUIT BREAKER, ELECTRONIC CIRCUIT BREAKER, AND ELECTRIC SYSTEM COMPRISING AN ELECTRONIC CIRCUIT BREAKER

CROSS-REFERENCE TO RELATED APPLICATIONS

This application is a national stage of PCT Application No. PCT/EP2023/052275, having a filing date of Jan. 31, 2023, claiming priority to DE Application No. 10 2022 201 963.6, having a filing date of Feb. 25, 2022, the entire both contents of which are hereby incorporated by reference.

FIELD OF TECHNOLOGY

The following relates to a method for operating an electronic circuit breaker, to an electronic circuit breaker, and to an electric system comprising an electronic circuit breaker.

BACKGROUND

Modern semiconductor circuit breakers (SCCB for short; sometimes also solid-state circuit breaker, SSCB for short; the abbreviation SCCB is used below) are able to switch off electric circuits in the event of a short circuit far more quickly than conventional miniature circuit breakers (MCB for short). This results in no further damage, beyond the damage triggering the short circuit, occurring at the electric circuit and, in particular. at the short-circuit location. In embodiments, the short-circuit currents are limited quickly to a much lower value, as a result of which less energy is supplied to the short-circuit location.

Accordingly, in circuits protected by SCCBs, the typical short-circuit features caused by the conversion of the short-circuit energy into thermal energy, such as the development of smoke or odor, discolorations or other visible damage, usually do not occur, which makes the search for a fault following a short-circuit event considerably more difficult.

EP 3 770 936 A1 discloses a method for protecting an electric circuit from faults and overloads, in which a load current flowing in the load circuit is determined and compared with the maximum permissible current. If the determined load current exceeds the maximum permissible current, the load is electrically isolated by switching off a semiconductor switch arranged in the load circuit. An (electro-)mechanical switching element is then switched off in order to physically isolate the load.

SUMMARY

An aspect relates to an improved electronic circuit breaker and a method for operating an electronic circuit breaker, which make it easier to locate the short-circuit location.

One advantage of embodiments of the invention can be seen in the fact that a circuit breaker according to embodiments of the invention, in particular, a semiconductor circuit breaker SCCB, enables or at least assists with the localization of a short-circuit location without the line itself having to be inspected in a complicated manner. This is a considerable advantage, in particular, in the case of lines laid in walls or underground, for example. In addition, a special diagnostic device does not need to be connected to the circuit affected by the short circuit—the diagnosis is carried out by the circuit breaker according to embodiments of the invention or the circuit breaker according to embodiments of the invention assists a superordinate device, which can be coupled to the circuit breaker on a case-by-case basis or permanently, with the diagnosis.

Components which are present anyway in modern circuit breakers, in particular in SCCBs, such as the electronic switching element that switches quickly in comparison with the mechanical switching element, the voltage measurement means and the current measurement of the SCCB, are used in this case, that is to say, apart from the control means which can be implemented in software or firmware for example, no adaptations need to be made to the SCCB.

BRIEF DESCRIPTION

Some embodiments will be described in detail, with references to the following Figures, wherein like designations denote like members, wherein.

DETAILED DESCRIPTION

Figure 1:
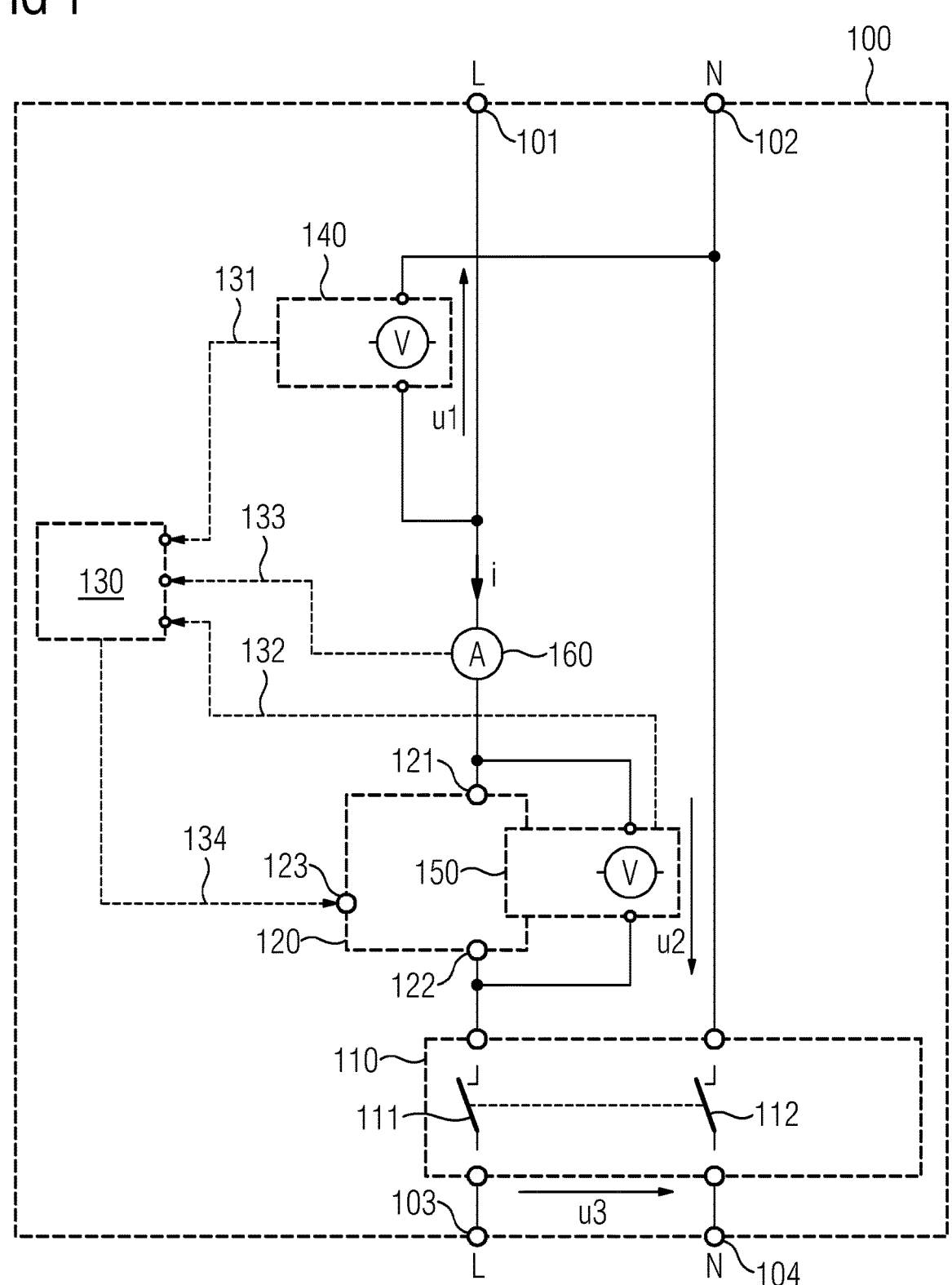
FIG. 1 shows a basic circuit diagram of a circuit breaker according to an exemplary embodiment of the present invention.

FIG. 1 shows a basic circuit diagram of a circuit breaker 100, in particular a semiconductor circuit breaker SCCB, according to an exemplary embodiment of the present invention. The SCCB 100 has network-side terminals 101 and 102 and load-side terminals 103 and 104. In this case, without restricting generality, the N conductor of the exemplary AC system extends between the terminals 102 and 104 and the L conductor extends between the terminals 101 and 103.

The SCCB 100 has at least one mechanical switching contact. In the example illustrated, the SCCB 100 has two mechanical switching contacts 111, 112 which, for both conductor paths L and N, can electrically isolate the input terminals 101, 102 from the output terminals 103, 104. In the example illustrated, the two switching contacts 111, 112 are coupled and are combined to form a two-pole mechanical isolating switch 110.

In addition to the (electro-)mechanical switching element 110, the SCCB 100 has an electronic switching element or a power semiconductor element 120 which is arranged in the L conductor path and has a network-side pole 121, a load-side pole 122 and a control input 123.

The electronic switching element 120 is controlled via the control input 123 by a control element 130 via a signal line 134, in particular is switched on and off on the basis of an operating state predefined by the control element 130. The control element 130 may be a microcontroller, for example. In exemplary embodiments of the invention, provision may also be made for the microcontroller 130 to also control the mechanical switching element 110 (not illustrated). In other exemplary embodiments, provision may be made for the mechanical switching element 110 to be controlled by a separate, electronic or electromechanical control element (not illustrated) which may be in turn coupled to the control element 130.

The control element 130 receives signals or measured values from sensors or measurement devices of the SCCB 100, which is indicated by arrows 131, 132, 133 in the illustration in FIG. 1. The possibly required signal conversions were not illustrated for the sake of better clarity, since appropriate mechanisms are well known to a relevant person skilled in the conventional art.

In the exemplary embodiment illustrated, the SCCB 100 has means 140 for determining the (AC) voltage u1 present at the network-side terminals 101, 102, from which a value representing the time-dependent voltage u1 is delivered to the control element 130 via the relationship 131.

The SCCB 100 also has means 150 for determining the voltage u2 dropped across the electronic switching element 120. A value representing the time-dependent voltage u2 is delivered from the means to the control element 130 via the relationship 132. In an exemplary embodiment, the control element 130 can determine a time-dependent voltage u3 at the output terminals 103, 104 from the values for u1 and u2 by simple addition or subtraction in a manner true to the sign. Expressed in the form of an equation, the following applies to the exemplary embodiment illustrated: $u3=u1-u2$.

In other exemplary embodiments, the voltage u3 can be determined directly by appropriate measurement means arranged at the output terminals (not illustrated), in which case the means 140 or 150 can be dispensed with on a case-by-case basis.

The exemplary SCCB 100 finally has means 160 for determining the current i flowing through the SCCB 100, which means are arranged in the conductor track L switched by the power semiconductor 120. The means 160 deliver a value representing the time-dependent current i to the control element 130 via the relationship 133.

Figure 4:
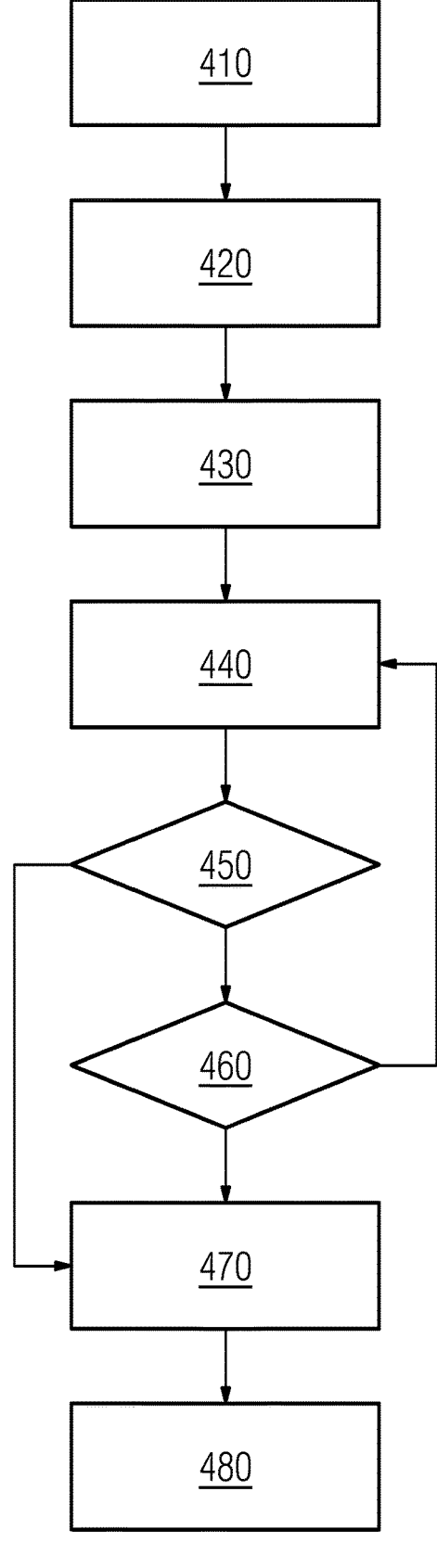
FIG. 4 shows a simplified flowchart of an exemplary embodiment of the method.
Figure 5:
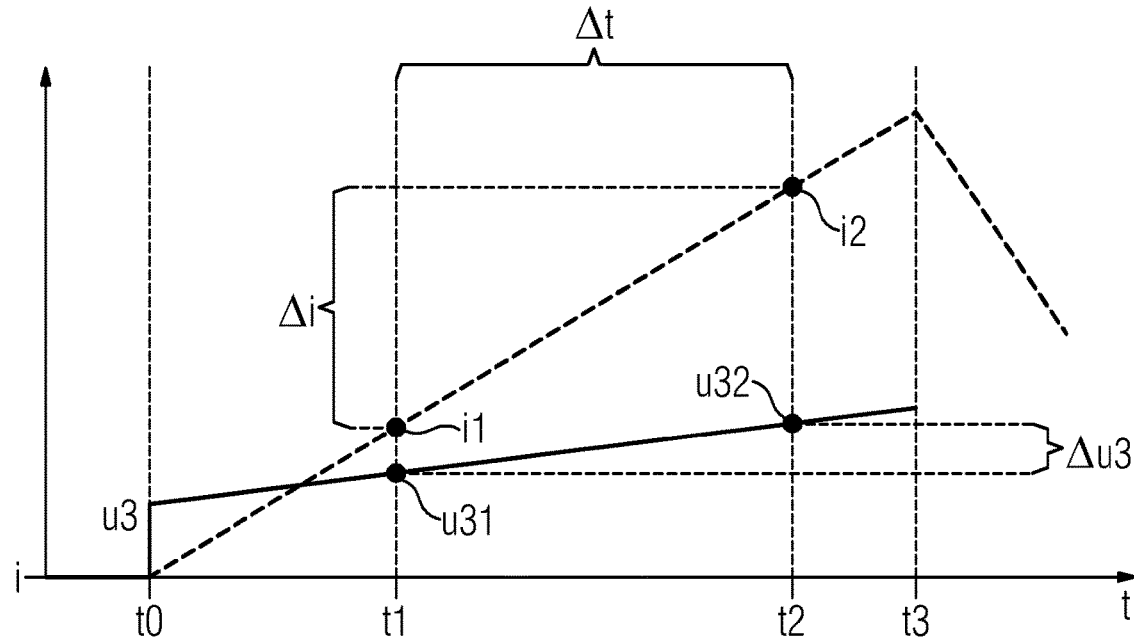
FIG. 5 shows an exemplary profile of current and voltage of a circuit breaker when carrying out an exemplary embodiment of the method.

The remaining method of operation of the controller 130 is explained in more detail further below in connection with FIG. 4 and FIG. 5.

Figure 2:
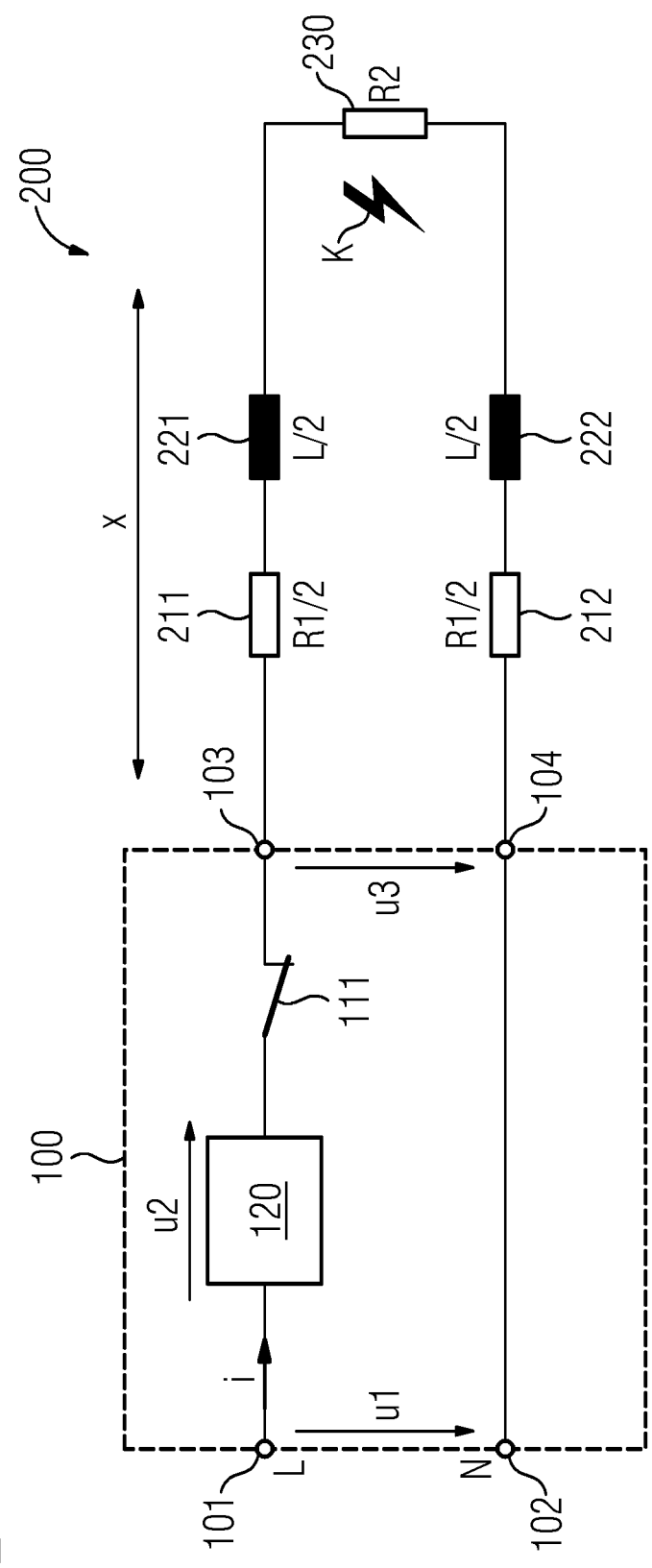
FIG. 2 shows an equivalent circuit diagram for a circuit affected by a short circuit having a circuit breaker according to an exemplary embodiment of the present invention.

FIG. 2 shows a highly simplified equivalent circuit of a load circuit 200 which is protected by an SCCB 100. The illustration of the SCCB 100 was also highly simplified and was reduced to the illustration of the network-side terminals 101, 102, the load-side terminals 103, 104 and the switching means 120, 111 in the L path. The already mentioned voltages u1, u2 and u3 and the current i are likewise illustrated for better clarity.

The load circuit 200 has a short circuit at a short-circuit location K in the line between the load-side terminals 103, 104 of the SCCB 100 and the actual load (not illustrated). The distance or more precisely the line length between the load-side terminals 103, 104 of the SCCB 100 and the short circuit is denoted by X and is indicated by a double-headed arrow. In the illustrated simplified equivalent circuit diagram of the load circuit 200, the line has the following elements starting from the load-side L terminal 103 of the SCCB 100: a first resistive line component 211 with the value R1/2, a first inductive line component 221 with the value L/2, a resistive short-circuit component 230 with the value R2, a second inductive line component 222 with the value L/2, and a second resistive line component 212 with the value R1/2.

With a view to a further simplification (cf. FIG. 3), it was already assumed for simplification that the resistive components 212, 212 and the inductive components 221, 222 are each approximately identical for the forward and return lines and therefore each correspond approximately to half the total line resistance R1 and the total line inductance L between the load-side terminals 103, 104 of the SCCB 100 and the short-circuit location K.

Figure 3:
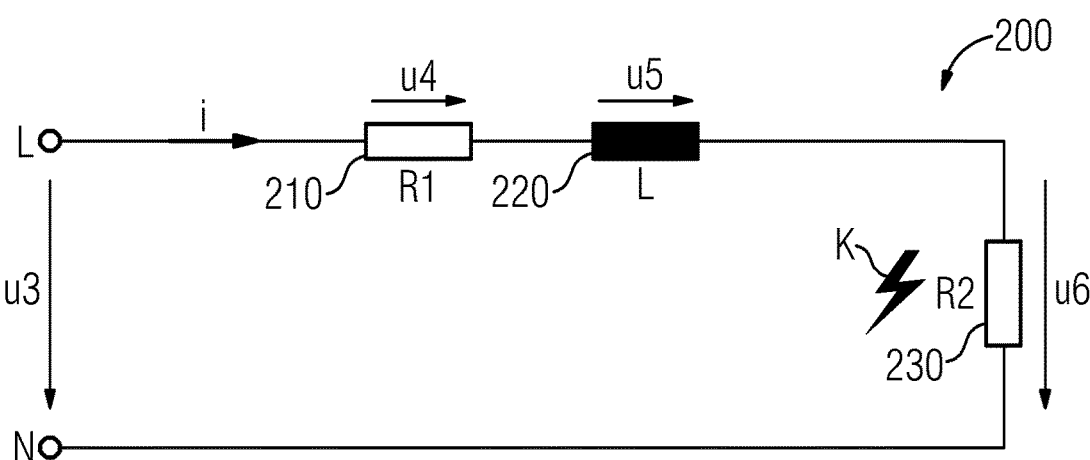
FIG. 3 shows a simplified equivalent circuit diagram of the circuit according to FIG. 2.

FIG. 3 shows a further simplified equivalent circuit diagram of the load circuit 200 between the load-side terminals 103, 104 of the SCCB 100 and the short-circuit location K. The resistive and inductive line components 211, 212, 221, 222 shown in FIG. 2 were combined to form a resistive line component 210 with the value R1 and an inductive line component 220 with the value L. For the purposes of further consideration, the resistive line component R1, the inductive line component L and the ohmic resistance R2 therefore form, at the short-circuit location K, the simplified load circuit 200, through which the current i flows. Present at the load-side terminals 103, 104 of the SCCB 100 is the voltage u3 which is simultaneously the time-dependent feed voltage of the load circuit 200 and is divided into time-dependent voltage drops u4, u5 and u6 across the components R1, L and R2. Expressed in the form of an equation: $u3=u4+u5+u6$.

An advantageous configuration of the method according to embodiments of the invention is explained below with reference to FIG. 4. In embodiments, the method starts in step 410, for example in response to a request generated by an operator, if the following prerequisites are present: the electronic switching element 120 of the SCCB 100 was switched off (or is in the high-resistance state) owing to a detected short-circuit event and the mechanical switching element 110 is closed (or was closed again).

Step 420 waits until the AC input voltage u1 at the input terminals 101, 102 of the SCCB 100 reaches a defined value, for example at least 80% of the positive or negative peak value of the AC input voltage, approximately the positive or negative peak value of the AC input voltage. In alternative exemplary embodiments, step 420 waits until the magnitude of the AC input voltage u1 at the input terminals 101, 102 of the SCCB 100 falls below a defined value, for example a value of less than or equal to a safety voltage, at which the inadvertent touching of live parts does not endanger people, for example 50 volts or less or 60 volts or less or 24 volts or less.

The electronic switching element 120 of the SCCB is then switched on in step 430, whereupon electric energy is applied to the load circuit 200 affected by the short circuit and current i begins to flow. With regard to FIG. 5, this is the time t0.

In step 440 (at the time t1 in FIG. 5), a current value i1 of the current i flowing in the load circuit 200 is determined and a voltage value u31 of the voltage u3 applied to the input side of the load circuit 200 is determined approximately at the same time. These values u31 and i1 are stored in a memory (not illustrated). For the SCCB 100 illustrated in the example in FIG. 1, the respective instantaneous values for u1 and u2 are determined at the time t1 and u31 is calculated therefrom; i is determined at the time t1 by the current measurement means 160. In configurations of embodiments of the present invention, u3 and i can also be recorded at different times. It may then be necessary to determine pairs of values for u3 and i by interpolation. This is useful, for example, if the SCCB 100 has a (single) voltage measurement means that is initially connected to the lines L and N, in order to determine an instantaneous value for u1 or u3, and is then connected to the terminals of a measurement resistor or shunt (not illustrated) integrated in the path L, in order to determine the voltage drop across this measurement resistor, from which the controller 130 then calculates an instantaneous value for the current i, for example.

Step 450 checks whether the instantaneous value i1 of the current i exceeds a maximum value of the current i that can be predefined for the method. If so, in embodiments the method is continued with step 470 for safety reasons. If not, in embodiments the method is continued with step 460. In desired configurations of embodiments of the invention, the maximum value of the current i that can be predefined for the method is five times the amplitude value of the nominal current of the circuit breaker 100. Alternatively, the check as to whether the current exceeds the predefinable maximum value can be carried out in parallel with the steps described here, for example at a higher interrogation frequency and/or by dedicated hardware, in order to safely and quickly prevent the maximum value for the current i from being exceeded as a result of switching-off of the electronic switching element 120 which is then initiated.

Similarly, step 450 can additionally or alternatively check whether the magnitude of the voltage u3 exceeds a predefinable maximum value, for example the protective voltage that has already been mentioned. If so, in embodiments the method is continued with step 470 for safety reasons. If not, in embodiments the method is continued with step 460.

Step 460 checks whether a predefinable number of values for u3 and i have been determined. In an exemplary embodiments, the minimum number of value pairs is 2. In further exemplary embodiments, 3, 4, 5, 6, 7 or 8 value pairs can be used, for example. The following generally applies: the higher the processing speed of the control unit, the more value pairs can be recorded, which then enables, in the calculation step 470, a plausibility check of the value pairs and/or filtering processes such as smoothing processes and/or interpolations at particular times and/or the masking of transient recovery processes.

In exemplary embodiments of the invention, it is additionally or alternatively possible to check, in parallel with the steps described here or integrated in the sequence described here at a suitable location, whether the time which has already passed since the electronic switching element 120 of the SCCB 100 was switched on in step 430 has reached a predefinable maximum value.

If the predefinable number of value pairs has not yet been reached and/or the maximum time for switching on the electronic switching element 120 has not yet been reached, the process jumps back to step 440 and instantaneous values for u3 and i are newly determined. This is indicated by way of example in FIG. 5: the values u32 and i2 are determined at the time t2, as described further above for u31 and i1.

If the predefinable number of value pairs has been reached and/or the maximum time for switching on the electronic switching element 120 has been reached, the repetition is ended and the process is continued with step 470.

In step 470, the electronic switching element 120 of the SCCB 100 is switched off if this has not already been carried out by processes taking place in a parallel manner (for example by one of the above-described checks for the exceeding of a maximum current value or maximum magnitude of the voltage or the maximum switch-on time). With regard to FIG. 5, the electronic switching element 120 is switched off at the time t3.

In step 470, the line impedance L of the line between the circuit breaker 100 and the short-circuit location K is then calculated at least approximately from the voltage values u31, u32 and the current measured values i1, i2 and their temporal spacing $\Delta t=t2-t1$. In an exemplary embodiments, $\Delta i=i2-i1$ and $\Delta u3=u32-u31$ are first of all calculated. The value of the total ohmic resistance between the terminals 103 and 104 is then estimated as an auxiliary variable using the following relationship: $R1+R2=\Delta u3/\Delta i$. This auxiliary variable is then used to estimate u5 at one of the times t1 or t2 (at t1 below): $u51=u31-u41-u61=u31-((R1+R2)*i1)$. An approximate value for di/dt is then determined by the relationship $di/dt=\Delta i/\Delta t$ and the approximate value sought for L is finally determined by the relationship $L=u51/(di/dt)$.

By the values u31, u32, i1, i2 determined by carrying out step 440 multiple times, here twice, the following equation results for the desired exemplary embodiment:

$$L = \left(u31 - (u32 - u31)/(i2 - i1) * i1\right)/\left((i2 - i1)/(t2 - t1)\right)$$

The inductance per unit length of the line used for the load circuit 200, which is known from data sheets for example and is stored for the respective load circuit 200 in a memory of the controller 130, can now be used to calculate the distance X between the load-side terminals 103, 104 of the SCCB 100 and the short-circuit location K from the value calculated for L and the inductance per unit length of the line, by dividing L by the inductance per unit length which is stated μHm, for example:

$$X = L/\text{inductance per unit length}$$

In this case, the inductance per unit length is dependent, in particular, on the line and/or conductor material and/or the conductor cross section and/or the arrangement of the conductors in the line.

The value determined in this manner for X is then stored and displayed to an operator or forwarded to a superordinate device (not illustrated) for display. The calculations described above can be completely carried out by the controller 130 of the SCCB. Alternatively, individual calculation steps or all calculation steps can be carried out by a superordinate device, with the result that, for example, the required computing power must be implemented only once for each switch box and/or is provided by a portable device if necessary. The superordinate and/or portable device may be connected to the SCCB 100 permanently or as required in a wired or wireless manner (not illustrated) and can have, in particular, a convenient display of the determined value for X and optionally further parameters.

In exemplary embodiments, instead of the value X, the value L is output to the operator or made available to the operator for output, and it is left to the operator to determine the inductance per unit length for the load circuit 200 and to then calculate X from L and the inductance per unit length. This has the advantage that the SCCB 100 or the superordinate device can be universally used and no individual parameterization of the inductance per unit length must be carried out, which reduces the installation effort in SCCBs and other devices which typically do not have a user interface.

In exemplary embodiments of the invention, the line resistance R1 of the line between the circuit breaker 100 and the short-circuit location K is calculated from the voltage values u31, u32 and the current measured values i1, i2 and is optionally output to the operator or made available to the operator for output. In certain exemplary embodiments, it can be assumed for simplification that the electrical resistance R2 at the short-circuit location is zero, that is to say R2=0. With the value of the total ohmic resistance between the terminals 103 and 104, which was referred to above as an auxiliary variable, there is then already an estimate for R1, specifically R1=Δu3/Δi.

In other exemplary embodiments, this simplifying assumption is not made, but rather R1 is first of all calculated from the determined line length X and a resistance per unit length of the line that is known for example from data sheets by multiplying X by a resistance per unit length (for example stated in mΩ/m):

$$R1 = X * \text{resistance per unit length}$$

The resistance per unit length is also dependent, in particular, on the line and/or conductor material and/or the conductor cross section and/or the arrangement of the conductors in the line.

The electrical resistance R2 at the short-circuit location K can then be optionally calculated from this value R1 and the value R1+R2 of the total ohmic resistance between the terminals 103 and 104, which was determined as the auxiliary variable, by subtracting R1 from this auxiliary variable. The relationship R2=(R1+R2)−R1=Δu3/Δi−R1 then applies to R2. The value for R2 may be output to the operator or may be made available to the operator for output or may be used for further calculations.

If, for example on account of an excessively high current or an excessively high magnitude of the output voltage of the SCCB or on account of the maximum time being reached, the method was passed to step 470 without sufficient values being available for the calculations described above, an error code can optionally be generated and transmitted to an operator or made available for transmission, which error code indicates that it was not possible to automatically determine the parameter(s) L and/or X.

After calculating and outputting or providing the parameters X and/or L and/or R1 and/or R2, the method ends with step 480. It is naturally possible to start the method again in response to a corresponding operator input. In exemplary embodiments, it is possible to allow the method to run automatically multiple times in succession and to perform averaging before outputting the parameters in order to arrive at a better estimate.

Furthermore, it is naturally possible to improve the reliability of the estimate by further value pairs. The estimate is based, inter alia, on the assumption that the processes described take place linearly (and in a quasi-steady-state manner with respect to the AC system to which the SCCB 100 and the load circuit 200 are connected) at the very short intervals of time considered. The evaluation of more than two value pairs then allows value pairs, in which the prerequisites mentioned above turn out to be incorrect by comparison with the other value pairs or interpolation, to be excluded from the consideration, for example in the event of transient recovery processes or interference coupled into the line.

As already mentioned, it is possible to allow the method described above to be completely carried out by a controller 130, for example a microcontroller, of a modern SCCB 100 and to transmit the results to a display device belonging to the operator via a wireless or wired interface. The display device may be, for example, a mobile device, for example a smartphone, that can be coupled to the SCCB 100 by Bluetooth or another short-range radio technology. The software running on this mobile device may be configured such that the operator initiates the method in the first place by a user input which is then transmitted to the SCCB 100. Alternatively, provision may be made for the SCCB 100 to transmit only the measured values and for the mobile device to carry out the calculations.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a circuit breaker protecting an electric circuit, the circuit breaker having a mechanical switching element and an electronic switching element connected in series with the latter, comprising:
   a) switching on the circuit again by means of the electronic switching element after the circuit has been switched off by the electronic switching element on account of a short circuit detected by the circuit breaker-in the protected circuit;
   b) determining at least two temporally spaced current measured values for a current flowing through the circuit breaker;
   c) determining at least two temporally spaced voltage values at load-side terminals of the electronic circuit breaker;
   d) switching off the circuit again by the electronic switching element if one or more of the following criteria occur:
      reaching a predefinable maximum value for the current flowing through the circuit breaker;
      reaching a predefinable period of time from the time at which the circuit is switched on again;
      determining a predefinable number of current and/or voltage measured values; and
   e) calculating a line impedance of the line between the circuit breaker and a short-circuit location from the voltage values and the current measured values and their temporal spacing.

2. The method as claimed in claim 1, wherein
   f) a length of the line between the circuit breaker and the short-circuit location is calculated from the calculated line impedance and an inductance per unit length of the line material used for the line.

3. The method as claimed in claim 1, wherein
   g) an ohmic resistance of the circuit is calculated from the voltage values and the current measured values.

4. The method as claimed in claim 3, wherein
   h) a resistance of the line between the circuit breaker and the short-circuit location is first of all calculated from a resistance per unit length of the line material used for the line and the length of the line between the circuit breaker and the short-circuit location and the electrical resistance at the short-circuit location is then calculated from the ohmic resistance of the circuit and the resistance of the line between the circuit breaker and the short-circuit location.

5. The method as claimed in 1, wherein steps b) and c) are carried out at the same time or at virtually the same time and pairs of current measured values and voltage values are determined in each case.

6. The method as claimed in claim 1, wherein some or all of the calculation steps e), f), g) and/or h) are carried out by the electronic circuit breaker.

7. The method as claimed in claim 1, wherein some or all of the calculation steps e), f), g) and/or h) are carried out by a superordinate device, wherein the current measured values and/or voltage values required for the respective calculation are transmitted from the circuit breaker to the superordinate device in a wireless or wired manner.

8. The method as claimed in claim 1, wherein the predefinable maximum value for the current flowing through the circuit breaker corresponds to five times the amplitude value of a nominal current of the circuit breaker or less.

9. The method as claimed in claim 1, wherein the predefinable period of time is selected from: 1 millisecond or shorter, and 100 microseconds or shorter.

10. The method as claimed in claim 1, wherein the circuit is switched on again if an AC voltage applied to the input side of the circuit breaker corresponds at least approximately to its peak value.

11. The method as claimed in claim 1, wherein the circuit is switched on again if the magnitude of an AC voltage applied to the input side of the circuit breaker is at least less than or equal to a safety voltage, at which inadvertent touching of live parts of the circuit does not endanger people.

12. The method as claimed in claim 11, wherein the circuit is switched off by the electronic switching element if the magnitude of the AC voltage applied to the input side of the circuit breaker exceeds the safety voltage.

13. An electronic circuit breaker having voltage measurement means and current measurement means and a processing unit that is programmed to carry out the method as claimed in claim 1.

14. An electric system having one or more circuit breakers as claimed in claim 13, which can be connected to the circuit breaker(s) in a wireless or wired manner, for calculating and/or displaying the length of the line between the circuit breaker and the short-circuit location of a circuit affected by a short circuit.

15. The electric system as claimed in claim 14, the circuit breaker(s) of which is/are configured such that the method for determining and/or displaying the length of the line between the circuit breaker and the short-circuit location can be initiated by the device.

* * * * *